D. E. SCHIMMEL.
EMERGENCY BRAKE FOR VEHICLES.
APPLICATION FILED NOV. 7, 1914.

1,150,707.

Patented Aug. 17, 1915.
2 SHEETS—SHEET 1.

WITNESSES
L. Hauerstein
C. Bradway

INVENTOR
David E. Schimmel
BY Munn & Co
ATTORNEYS

D. E. SCHIMMEL.
EMERGENCY BRAKE FOR VEHICLES.
APPLICATION FILED NOV. 7, 1914.
1,150,707.
Patented Aug. 17, 1915.
2 SHEETS—SHEET 2.
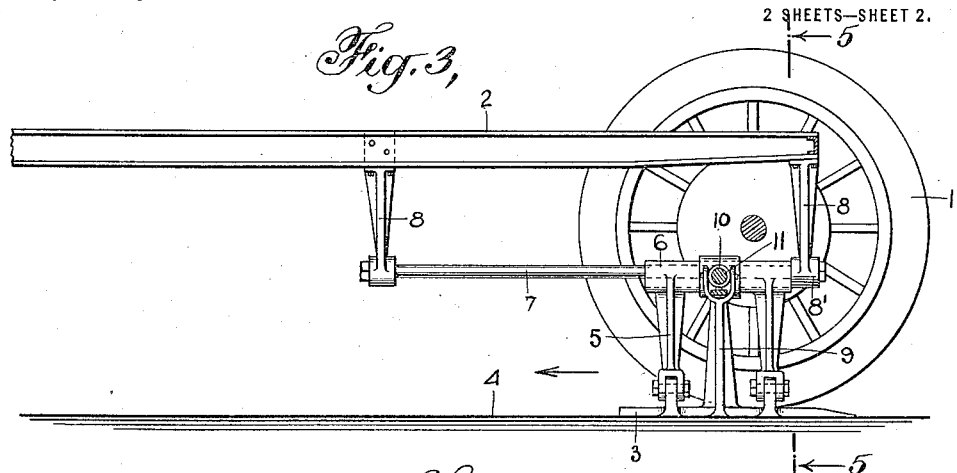
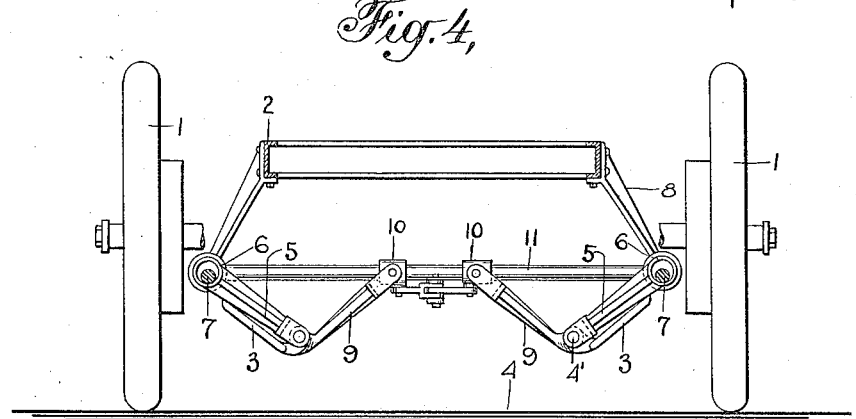
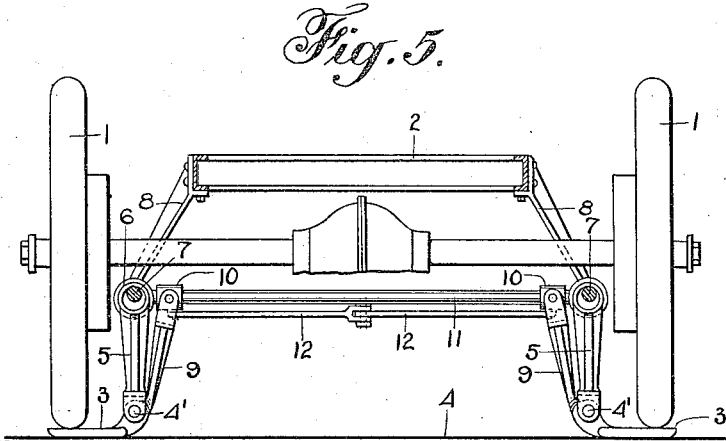
WITNESSES
L. Hauerstein
C. Bradway.
INVENTOR
David E. Schimmel
BY Munn & Co
ATTORNEYS
COLUMBIA PLANOGRAPH CO., WASHINGTON, D. C.

UNITED STATES PATENT OFFICE.

DAVID E. SCHIMMEL, OF NEW YORK, N. Y., ASSIGNOR OF ONE-HALF TO JOSEPH COHEN, OF BROOKLYN, NEW YORK.

EMERGENCY-BRAKE FOR VEHICLES.

1,150,707.  Specification of Letters Patent.  Patented Aug. 17, 1915.

Application filed November 7, 1914. Serial No. 870,810.

*To all whom it may concern:*

Be it known that I, DAVID E. SCHIMMEL, a citizen of the United States, and a resident of the city of New York, borough of Brooklyn, in the county of Kings and State of New York, have invented a new and Improved Emergency-Brake for Vehicles, of which the following is a full, clear, and exact description.

This invention relates to emergency brakes especially adapted for automobiles, although it may be used in connection with other vehicles, and it embodies brake elements which are adapted to be interposed between the vehicle wheels and the road surface, whereby the wheels are removed from contact with the road surface and the brake elements frictionally engage the latter to effect a sudden stoppage of the vehicle.

The invention has for its general objects to provide a comparatively simple, reliable and efficient brake mechanism of the character referred to and one which is easily and quickly thrown from an inoperative to an operative position whenever the driver is aware of the necessity of quickly stopping the automobile.

A further object of the invention is the provision of a plurality of brake elements which normally occupy a raised or indrawn position and are movably supported on the vehicle body and provided with operating means whereby the driver first throws the brake elements outwardly and downwardly into alinement with the wheels so that the latter will pass upon the brake elements which drag on the road surface and thereby stop the vehicle by frictional contact with the road surface.

With such objects in view, and others which will appear as the description proceeds, the invention comprises various novel features of construction and arrangement of parts which will be set forth with particularity in the following description and claims appended hereto.

Figure 1:
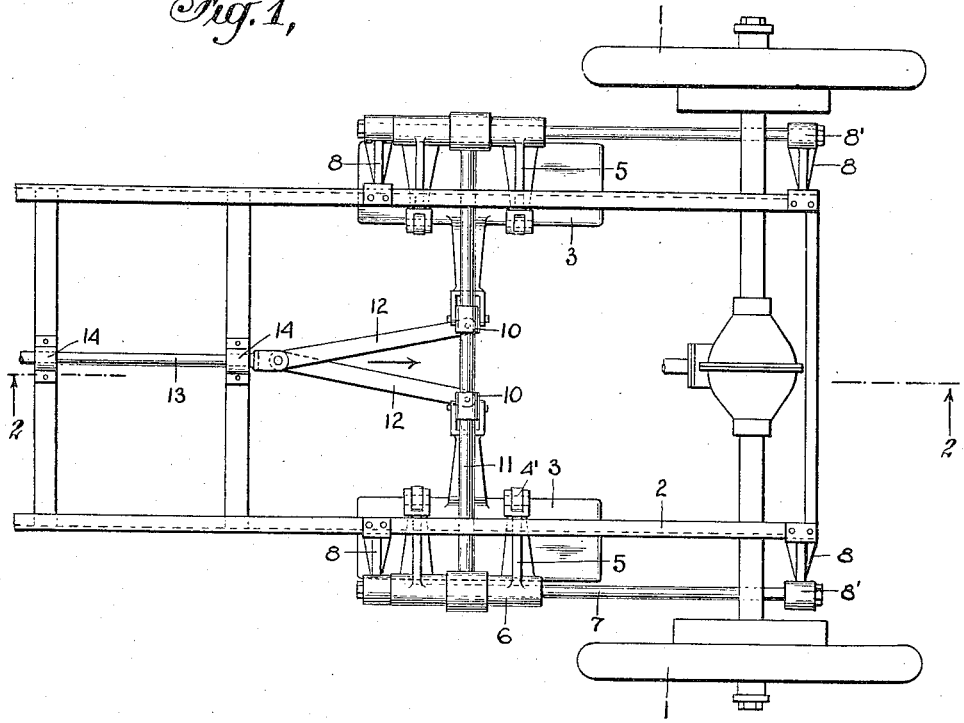
Figure 2:
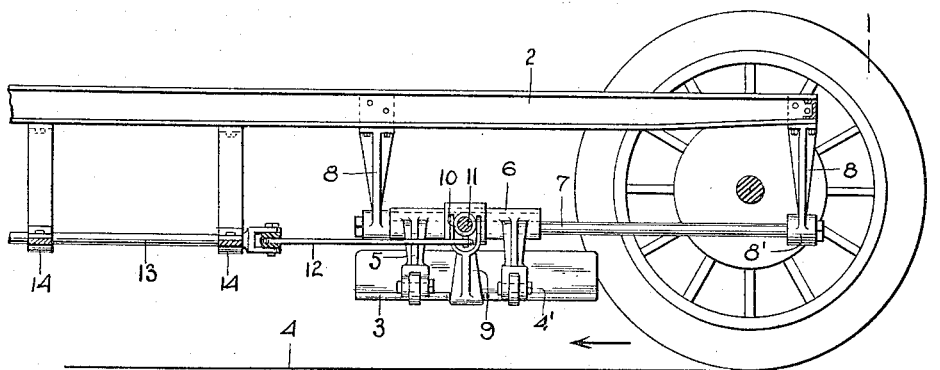

In the accompanying drawings, which illustrate one embodiment of the invention, and wherein similar characters of reference indicate corresponding parts in all the views, Figure 1 is a plan view of a rear portion of an automobile chassis equipped with the emergency brake; Fig. 2 is a vertical section on the line 2—2, Fig. 1; Fig. 3 is a similar view showing the emergency brake elements in operative position; and Figs. 4 and 5 are sectional views on the line 5—5, Fig. 3, showing the brake elements respectively in inoperative and operative positions.

In the present instance the emergency device is shown attached to an automobile, but it is to be understood that it may be used in connection with other vehicles.

In the drawings, 1 designates the rear wheels of an automobile which are driven in the usual manner, and supported by the wheels is the frame 2 for the automobile body, and on this frame is mounted the emergency brake mechanism.

The emergency brake mechanism comprises plate-like elements 3, which are adapted to be interposed between the wheels 1 and the road surface 4, as shown in Figs. 3 and 5, but normally these brake elements are retracted to an inoperative position suitably remote from the wheels and above the road surface. The plates 3 are hingedly connected at 4′ with depending spaced arms 5 that are fastened to horizontal sleeves 6 that slide on horizontal supporting rods 7, which rods are in turn rigidly fastened by brackets 8 to the frame 2 of the vehicle. The sleeves 6 are free to rotate on their respective rods 7, so that the brake elements 3 can be thrown to and from operative position. Each brake element 3 has a suitably arranged arm 9 which is pivotally connected with a collar 10 slidable on a horizontal rod 11, such rod being rigidly secured at its ends to the sleeves 6, and these collars 10 are adapted to move outwardly and inwardly to cause the brake elements 3 to move from inoperative to operative position, and vice versa. The collars 10 are connected by any suitable operating means which is under the control of the driver, and in the present instance the collars 10 are connected with links 12 which are in turn connected with a rod 13 slidable in bearings 14 on the vehicle frame. The rod 13 is actuated by the driver so as to move backwardly or forwardly to throw the collars 10 outwardly or inwardly. When the driver realizes that it is necessary to use the emergency brake mechanism to abruptly stop the automobile, he operates the rod 13 rearwardly so as to force the collars 10 outwardly, and in so doing the brake elements 3 are thrown downwardly and outwardly about the rods 7 as centers. Finally the brake elements 3 come into contact with the road surface and are arrested thereby, and as a consequence the wheels 1, which are traveling forward, run upon the brake elements 3 and finally the rear ends of the sleeves 6 strike the abutments 8' formed by the lower ends of the brackets 8, so that the brake elements will be moved forwardly by the momentum of the automobile and drag on the road surface until the automobile is brought to a stop. It will be understood that when the brake elements first contact with the road surface, these elements, sleeves 6 and rod 11 slide, as it were, on the rod 7 from the position shown in Fig. 2, to that shown in Fig. 3.

The sleeves 6 are of larger diameter than the rods 7, to permit the said rods to rise with the vehicle body as the wheels 1 ride on the brake elements 3, this difference in the relative positions of the sleeves 6 and rods 7 being apparent by comparison of Figs. 4 and 5. After the vehicle is stopped and it is desired to restore the brake mechanism to normal condition, the rear wheels 1 are reversed so that they run off the brake elements 3, and when the sleeves 6 reach the forward ends of the supporting rods 7, the operator restores the brake elements to normal positions, as shown in Figs. 2 and 4. While the mechanism has been described as a brake it is to be understood that either half of the mechanism may be employed as a runner in place of a wheel when the latter is broken or otherwise disabled, whereby the vehicle can be towed to a place of repair. As only one-half of the mechanism will be required under these conditions, the other half can be disconnected.

From the foregoing description taken in connection with the accompanying drawings, the advantages of the construction and method of operation will be readily understood by those skilled in the art to which the invention appertains, and while I have described the principle of operation, together with the mechanism which I now consider to be the best embodiment thereof, I desire to have it understood that the mechanism shown is merely illustrative, and that such changes may be made when desired as are within the scope of the appended claims.

Having thus described my invention, I claim as new and desire to secure by Letters Patent:

1. An emergency brake mechanism for vehicles, comprising a vehicle frame, wheels supporting the frame, numbers extending longitudinally of the frame, a cross-member supported on the first-mentioned members and movable back and forth thereon, brake elements movable back and forth on the first-mentioned members with the cross-member, and means carried by the cross member and moving the brake elements inwardly and outwardly into and out of coöperative relation with the wheels and for moving the cross member back and forth.

2. In an emergency brake mechanism for vehicles, the combination of a vehicle frame, wheels supporting the frame, parallel longitudinally extending members on the frame, a cross-bar movably mounted on the members, brake elements pivotally and slidably mounted on the members and movable back and forth by the said bar, means slidable on the bar and connected with the brake elements for throwing the latter inwardly and outwardly into and out of coöperative relation with the wheels, and an operating device connected with the said means for actuating the same and shifting the said bar back and forth.

3. In an emergency brake mechanism for vehicles, the combination of a vehicle frame, wheels supporting the frame, supports extending longitudinally of the frame, a member slidable longitudinally of each support and swinging transversely thereof, a brake element pivotally mounted on each member, and an operating means connected with the brake elements for moving the same back and forth longitudinally of the vehicle frame and inwardly and outwardly transversely to the frame to and from coöperative relation with the wheels.

4. The combination of a vehicle frame, wheels supporting the same and longitudinally extending supporting rods on the frame, with an emergency brake mechanism comprising sleeves having larger diameters than the rods and freely movable on the latter, rigidly connecting means between the sleeves, an arm on each sleeve, brake elements in the form of plates pivotally connected with the said arms, collars sliding on the said connecting means, an arm on each brake element, pivotal connections between the arms and collars, and means for moving the collars outwardly or inwardly to throw the brake elements to and from operative position.

In testimony whereof I have signed my name to this specification in the presence of two subscribing witnesses.

DAVID E. SCHIMMEL.

Witnesses:
CHATTIN BRADWAY,
PHILIP D. ROLLHAUS.

Copies of this patent may be obtained for five cents each, by addressing the "Commissioner of Patents, Washington, D. C."